(12) United States Patent
McLurkin et al.

(10) Patent No.: US 7,117,067 B2
(45) Date of Patent: Oct. 3, 2006

(54) SYSTEM AND METHODS FOR ADAPTIVE CONTROL OF ROBOTIC DEVICES

(75) Inventors: James McLurkin, Somerville, MA (US); Jennifer Smith, Cambridge, MA (US)

(73) Assignee: iRobot Corporation, Burlington, MA (US)

( * ) Notice: Subject to any disclaimer, the term of this patent is extended or adjusted under 35 U.S.C. 154(b) by 246 days.

(21) Appl. No.: 10/417,401

(22) Filed: Apr. 16, 2003

(65) Prior Publication Data

US 2004/0024490 A1 Feb. 5, 2004

Related U.S. Application Data

(60) Provisional application No. 60/373,017, filed on Apr. 16, 2002, provisional application No. 60/417,836, filed on Oct. 11, 2002.

(51) Int. Cl.
*G06F 19/00* (2006.01)

(52) U.S. Cl. .................. 700/245; 700/248; 700/249; 700/253; 700/257; 700/260; 700/263; 700/264; 701/1; 701/23; 701/24; 701/25; 701/26; 701/120; 701/200; 901/1; 901/2; 901/3; 901/8; 901/9; 901/10; 901/23; 414/1; 414/703; 318/568.11; 318/568.2; 703/7; 294/86.4

(58) Field of Classification Search .............. 700/245, 700/248–249, 253, 257, 260, 263–264; 701/1, 701/120, 123, 200, 207, 215, 23–26, 300, 701/301; 901/1–3, 8–10, 23, 29, 31, 39–41; 414/1, 730; 318/568.11, 568.2, 587; 703/7; 294/86.4
See application file for complete search history.

(56) References Cited

U.S. PATENT DOCUMENTS

| | | | |
|---|---|---|---|
| 5,819,008 A | 10/1998 | Asama et al. ................ 395/90 |
| 6,374,155 B1 | 4/2002 | Wallach et al. ............. 700/245 |
| 6,408,226 B1 | 6/2002 | Byrne et al. ................ 700/258 |
| 6,507,771 B1 | 1/2003 | Payton et al. ............... 700/245 |
| 6,577,906 B1 | 6/2003 | Hurtado et al. ................ 700/2 |
| 6,687,571 B1 | 2/2004 | Byrne et al. | |
| 2002/0095239 A1* | 7/2002 | Wallach et al. ............. 700/245 |
| 2003/0171846 A1* | 9/2003 | Murray et al. .............. 700/245 |
| 2003/0212472 A1* | 11/2003 | McKee ....................... 700/245 |
| 2004/0020000 A1* | 2/2004 | Jones .......................... 15/319 |
| 2004/0093650 A1* | 5/2004 | Martins et al. ................. 901/1 |

OTHER PUBLICATIONS

Huang et al., Construction and Soccer dynamics analysis for an integrated multi-agent soccer robot system, 2001, Internet, pp. 84-93.*

(Continued)

*Primary Examiner*—Thomas G. Black
*Assistant Examiner*—McDieunel Marc
(74) *Attorney, Agent, or Firm*—Goodwin Procter, LLP

(57) ABSTRACT

Methods for operating robotic devices (i.e., "robots") that employ adaptive behavior relative to neighboring robots and external (e.g., environmental) conditions. Each robot is capable of receiving, processing, and acting on one or more multi-device primitive commands that describe a task the robot will perform in response to other robots and the external conditions. The commands facilitate a distributed command and control structure, relieving a central apparatus or operator from the need to monitor the progress of each robot. This virtually eliminates the corresponding constraint on the maximum number of robots that can be deployed to perform a task (e.g., data collection, mapping, searching). By increasing the number of robots, the efficiency in completing the task is also increased.

18 Claims, 6 Drawing Sheets

OTHER PUBLICATIONS

Graf et al., Robot Soccer, 1999, Internet, pp. 1-96.*

Lee, et al., A robot in intelligent environmetn: Soccer Robot, 1999, IEEE, pp. 73-78.*

Kanda et al., Development and evaluation of an interactive humanoid robot, 2002, IEEE, pp. 1848-1855.*

Report dated Mar. 20, 2001, under contract No. N66001-99-C-8513, pp. 1-14.

Report dated May 31, 2002, under contract No. N66001-99-C-8513, pp. 1-44.

Report covering May 1, 2002 to Jul. 31, 2002, under contract No. DASG60-02-C-0028, pp. 1-10.

Lumelsky, V.J. et al., "Decentralized motion planning for multiple mobile robots: the Cocktail Party Model," University of Wisconsin-Madison, pp. 1-22.

Werger, B.B., "Cooperation without Deliberation: A Minimal Behavior-based Approach to Multi-robot Teams," Interaction Lab, Department of Computer Science, University of Southern California, Los Angeles, CA, Dec. 15, 1998, pp. 1-33.

Werger, B.B. et al., "Broadcast of Local Eligibility: Behavior-Based Control for Strongly Cooperative Robot Teams," Computer Science/Robotics Research Labs, University of Southern California, Los Angeles, CA (2 pgs.).

Parket, L.E. et al., "Current State of the Art in Distributed Autonomous Mobile Robotics," *Distributed Autonomous Robotic Systems 4*, Springer-Verlag Tokyo 2000, pp. 3-12.

Arnold, D., "MIT student honored for robot design," *The Boston Globe*, Feb. 27, 2003, pp. B1 and B12.

Muther, C., "Tired of vaccuming? Have $200 robot do it instead," *The Boston Globe*, Apr. 20, 2003.

"Gift boxes," *The Boston Herald*, Feb. 27, 2003.

* cited by examiner

SYSTEM AND METHODS FOR ADAPTIVE CONTROL OF ROBOTIC DEVICES

CROSS-REFERENCE TO RELATED APPLICATIONS

This application claims priority to and the benefit of, and incorporates herein by reference, in their entirety, the following provisional U.S. patent applications:
Ser. No. 60/373,017, filed Apr. 16, 2002; and
Ser. No. 60/417,836, filed Oct. 11, 2002.

STATEMENT REGARDING FEDERALLY SPONSORED RESEARCH OR DEVELOPMENT

The U.S. Government may have certain rights in this invention as provided for by the terms of one or more of the following contracts:
Contract N66001-99-C-8513 awarded by Space and Naval Warfare Systems Center of the Department of the Navy;
Contract DASG60-02-C-0028 awarded by U.S. Army Space and Strategic Defense Command of the Department of the Army;
Contract DAAD16-00-C-9219 awarded by the U.S. Army Material Command Acquisition Center of the Department of the Army; and
Contract DAAH01-02-C-R029 awarded by the U.S. Army Aviation and Missile Command of the Department of the Army.

FIELD OF THE INVENTION

The present invention relates generally to robotic devices and, more specifically, to systems and methods for configuring, monitoring, and controlling one or more robotic devices to complete tasks in a cooperative and autonomous fashion.

BACKGROUND OF THE INVENTION

Robotic devices (i.e., "robots") are capable of performing many tasks, such as data collection, searching, and mapping. Generally, these tasks are defined programmatically using a software development system. One or more robots receive the programmed instructions, execute them, and perform the corresponding tasks. This generally occurs under the auspices of a central command and control apparatus.

When a task is complex or large scale (e.g., mapping a big area), the time to complete the task can be prohibitive if an insufficient number of robots are employed. Consequently, to improve efficiency, more robots are typically added to share the task (or parts of the task) and drive it to completion earlier. A small increase in the number of deployed robots can complicate command and control, but not to the point where the array of robots becomes unmanageable.

Difficulties can ensue when efficient completion of the task requires the deployment of more than just a small number of robots. At this level, the central command and control apparatus typically cannot exercise complete management of the group of robots. Further, a human operator overseeing the robots can be overwhelmed trying to monitor the progress of (and potentially control) every robot. In fact, when working with large numbers of robots, an operator often cannot manually program, charge, or even turn on the robots. Moreover, control strategies for multiple robots need to be robust in the face of complex environments and tolerant to the failure of any number of individual robots within the group. Optimally, a control strategy is designed to be completely scaleable to function with any number of robots.

A robot typically observes its environment during the performance of the task. For example, a robot can sense when it has encountered an obstacle and, optionally, attempt to circumvent the obstacle. When several robots are deployed to complete a task, it is likely they will encounter each other. On the one hand, the robots can simply avoid each other (i.e., to eliminate the potential of collisions) and continue to perform their duties in a virtually independent manner. Nevertheless, efficiency can be improved beyond that attained by increasing the number of robots by allowing the robots to interact with each other and adapt their behavior accordingly, ideally without intervention from a central command and control apparatus or an attending operator (i.e., autonomously).

From the foregoing, it is apparent that there is still a need for a way to allow increasing the number of robots performing a particular task while, at the same time, distributing command and control to, for example, the individual robots. Further, it is desirable to accomplish this in conjunction with allowing interaction between the robots, resulting in the adaptive behavior thereof.

SUMMARY OF THE INVENTION

The present invention provides systems and methods for operating several robotic devices without requiring complete reliance on a central command and control apparatus. To increase efficiency, the number of robots deployed to complete a task may be increased significantly and generally without the concern of overwhelming the command and control structure. Further, the robots are able to interact with each other and adapt their behavior accordingly. This improves efficiency as well.

The invention features a method for operating robots, where one robot receives one or more multi-device primitive command and data representing the state of a second robot. Either the first or second robot then completes a task (e.g., data collection, mapping, searching, etc.) in response to the command and data. The second robot can transmit the data to the first robot directly, or through a one or more intermediaries. Transmission can occur using any medium (e.g., optical, radio frequency, audible, etc.).

In certain embodiments, the robots include one or more optical sensors, audio sensors, radio frequency receivers, positional sensors, tactile sensors, environmental sensors, and electromagnetic sensors. Consequently, the data representing the state of the second robot can include information obtained from one or more of these elements. Using one or more of an optical transmitter, an audio transmitter, a radio frequency transmitter, a stigmergy transmitter, or a hardwire port, the second robot can send this data to the first robot. Reception is generally accomplished using one or more of an optical receiver, an audio receiver, a radio frequency receiver, or a hardwire port.

In other embodiments, each robot is capable of monitoring its readiness to complete a task. It typically transmits information regarding its readiness to, for example, other robots. Transmission of an out of service message (or a failure to receive any message after a certain interval), generally indicates a disabled robot and typically triggers performance of a different (i.e., "contingency") task to address an operational deficiency or malfunction.

An alternative embodiment features a method for monitoring two or more robots. Typically, each robot has an optical transmitter, or an audio transmitter, or both. The transmitters are configured to emit signals representative of the operational state of the corresponding robot. When a group of robots are present, variations in the signals from robot-to-robot help identify inconsistent behaviors.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Figure 1A:
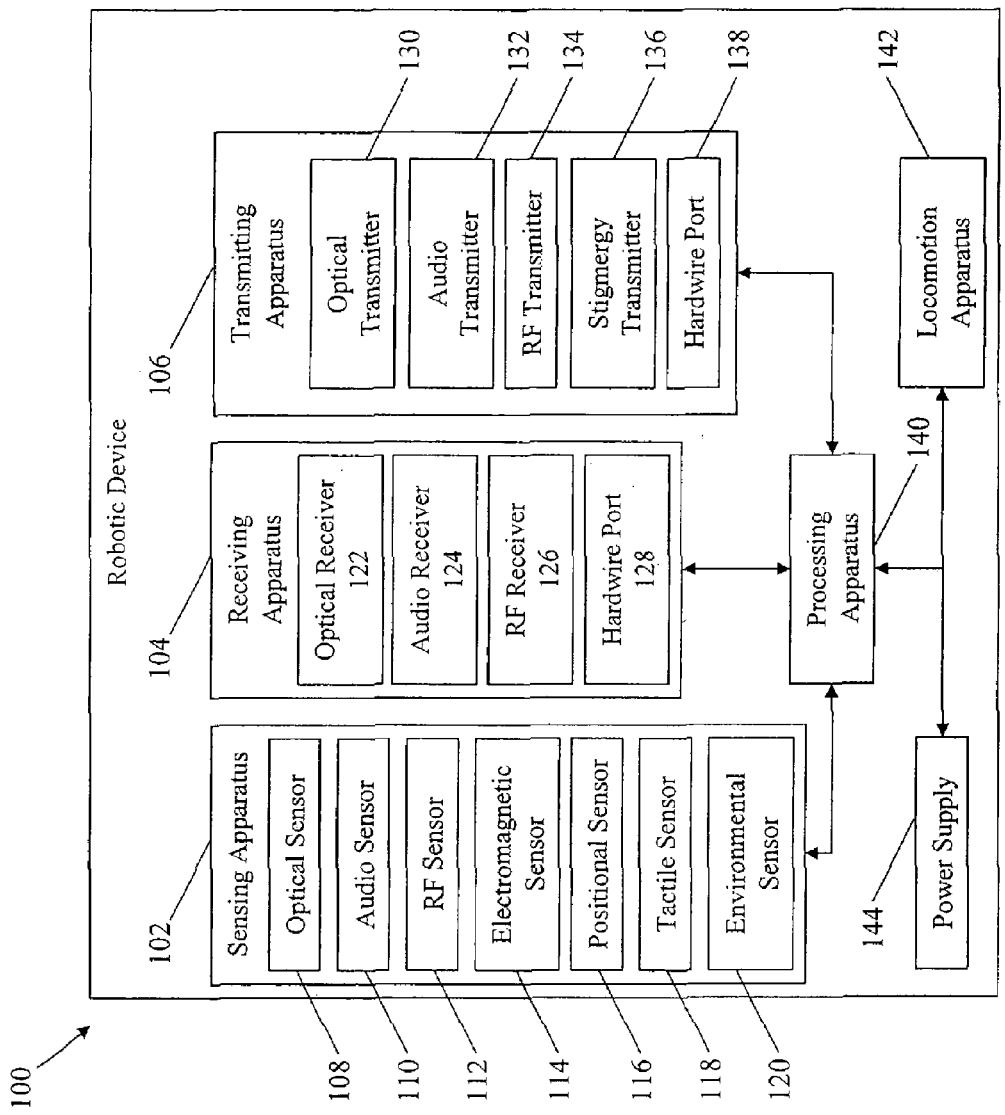
FIG. 1A is a block diagram depicting components of a robotic device in accordance with an embodiment of the invention.

As shown in the drawings for the purposes of illustration, the invention may be embodied in a method for operating robotic devices capable of receiving, processing, and acting on one or more multi-device primitive commands. These commands, in conjunction with data obtained from other robots, allow several robots to interact with each other and adapt their behaviors accordingly. Embodiments of the invention allow the deployment of several robots generally without overtaxing a central command and control apparatus or operator.

In brief overview, FIG. 1A is a block diagram depicting components of a robotic device 100 in accordance with an embodiment of the invention. The robotic device (alternatively, "robot") 100 typically includes subsystems, such as sensing apparatus 102, receiving apparatus 104, and transmitting apparatus 106, for processing signals and data. For example, the sensing apparatus 102 typically includes components that generate data related to the environment surrounding the location occupied by the robot 100. One such component can be an optical sensor 108. In one embodiment, the optical sensor 108 is a simple photodetector for characterizing (e.g., measuring) the ambient light (e.g., visible, infrared, ultraviolet) about the robot 100. On the other hand, the optical sensor 108 can be configured to detect contrast differences in material near the robot 100. In this case the optical sensor 108 would typically include one or more CCD imaging components. This may be enhanced by including a camera (e.g., a CCD camera) that captures video images.

The sensing apparatus 102 can also include an audio sensor 110. A typical audio sensor 110 can be, for example, a microphone for receiving audible signals, thereby giving the robot 100 the ability to "hear." The audio sensor 110 can also be configured to receive audio signals outside the audible range (i.e., subsonic or ultrasonic signals, or both), such as those used with, for example, vibration analysis, distance measurement, and intruder detection. Multiple audio sensors 110 may be employed, thereby allowing the determination of the location of an audio source by, for example, analyzing and comparing the characteristics of the signals received by each.

For detecting radio frequency ("RF") emissions, the sensing apparatus 102 can include an RF sensor 112. Depending on the application and environment, the RF sensor 112 can be configured to receive RF signals across a wide or narrow frequency spectrum. The RF sensor 112 can simply provide an indication of the presence of RF emissions about the robot 100. Alternatively, the RF sensor 112 can include additional signal processing circuitry to demodulate, decode, or otherwise interpret the RF emissions, thereby revealing intelligence in the emissions. The robot 100 can then react on the basis of this "signal intelligence."

The sensing apparatus 102 can also include an electromagnetic sensor 114. This sensor is similar to the RF sensor 112, but it is configured to detect electromagnetic signals that typically fall outside the RF range. For example, the electromagnetic sensor 114 may perceive the presence of a power line or other low frequency signal. The electromagnetic sensor 114 may also include Hall-effect devices that permit the detection of magnetic material. In a related embodiment, the electromagnetic sensor 114 detects the presence of metallic material.

In one embodiment, the robot 100 is a mobile device. Consequently, to collect data on the position and motion of the robot 100, the sensing apparatus 102 can include a positional sensor 116. The positional sensor 116 typically is capable of determining the location of the robot 100, either in absolute terms or relative to a defined point, in one, two, or three dimensions, or relative to another robot. For example, the positional sensor 116 can include a compass and rotary encoders that allow a position to be determined based on dead reckoning. Alternatively, the positional sensor 116 can include the necessary hardware and software to receive and process signals from Global Positional System ("GPS") satellites, thereby providing a high-accuracy determination of position. Optionally, the positional sensor 116 can detect if the robot 100 is no longer level or has toppled.

The positional sensor 116 may also include the capability to determine one or more of speed, velocity, or acceleration of the robot 100. For example, the positional sensor 116 can include one or more rotary encoders for measuring speed. Including a compass and integrating its data with that from the rotary encoders would typically yield a determination of velocity. Alternatively, the positional sensor 116 may include a gyroscope to detect changes in orientation. The positional sensor 116 may also include an accelerometer (e.g., a MEMS accelerometer) to determine the acceleration of the robot 100.

In one embodiment, objects that approach the robot 100 (or, objects that the robot 100 approaches) are first detected by employing the audio sensor 110 in connection with distance measurement, as discussed above. For example, the robot 100 can collect data to show that the robot 100 and the object are nearing each other. At some point the robot 100 and object may contact each other. A tactile sensor 118 generally detects this event. Typically, the tactile sensor 118 is electromechanical in nature, employing switches (e.g., piezoresistive switches) that react to various (and generally configurable) levels of external mechanical contact force. The tactile sensor 118 may be directional or omnidirectional. The switches may also be capacitive, meaning that they react to changes in capacitance when the robot 100 contacts the object. Further, if they are sufficiently sensitive, the capacitive switches can typically detect close proximity of the object to the robot 100 (i.e., without contact). In any case, the tactile sensor 118 is typically disposed about the periphery of the robot 100 in a leading position, so as to contact the object before other parts of the of the robot 100 make contact. In an alternative embodiment, the tactile sensor 118 is used to orient the robot 100 relative to a second robot when the two are sufficiently close such that other communication methods are unavailable.

In a related embodiment, the tactile sensor 118 also senses the angle at which the robot 100 interacts with an object. For example, several (e.g., two) tactile sensors 118 may be disposed on each side of the robot 100. Assuming each tactile sensor 118 detects the object, the time difference between the respective detections is determined. The processing apparatus 140 uses the time differences and the known geometric placement of the tactile sensors 118 and computes an angle at which the robot 100 interacts with an object. (Note that, in some embodiments, the tactile sensors 118 can be optical in nature and detect contact, or proximity, or both, by optical means.)

Typically, the atmospheric conditions at the location of the robot 100 are important in certain applications. Consequently, in one embodiment, the sensing apparatus 102 includes an environmental sensor 120 that reacts to atmospheric conditions. For example, the environmental sensor 120 can include components to determine ambient temperature, pressure, humidity, and the like. In related embodiments, the environmental sensor 120 detects the presence of one or more of radioactive materials, explosive materials, or specific chemical elements. In any case, the environmental sensor 120 can also be configured to determine environmental characteristics of an object about the robot 100 by, for example, the robot 100 placing the environmental sensor 120 in, on, or near the object.

In various embodiments, the sensing apparatus 102 includes one or more amplifiers, and it may incorporate signal processing apparatus, to enhance or modify the signals and data received.

In addition to the sensing apparatus 102, the robot 100 typically includes a receiving apparatus 104. In general, the receiving apparatus 104 is configured to receive signals that include commands and other data from, for example, one or more other robots. These signals may be conveyed from their source (e.g., one or more other robots) to the robot 100 optically, via RF, via audio frequency, or via a physical link. In various embodiments, the receiving apparatus 104 includes one or more amplifiers, and it may incorporate signal processing apparatus, to enhance or modify the command and data signals received.

In one embodiment, an optical receiver 122 is configured to receive signals that are typically sent using infrared light. These signals may be sent via a fiber optic link, or across open air. Although depicted in FIG. 1A as separate from the optical sensor 108, the optical receiver 122 may be integrated with the optical sensor 108. Further, the optical receiver 122 and the optical sensor 108 may be the same component, albeit with the capability to perform the different functions required by each.

The receiving apparatus 104 can also include an audio receiver 124 that receives command and data signals conveyed from their source at one or more audio frequencies. The signals can be either inside or outside of the audible range. For example, the robot 100 can be configured to react to commands given as one or more sounds (e.g., beeps, tones, chirps) uttered by an operator. The audio receiver may also be capable of speech recognition, thereby permitting word- or phrase-based commands that the robot 100 can recognize and act on. The audio receiver 124 may also be configured to react to signals conveyed subsonically, or ultrasonically, or both.

Although depicted in FIG. 1A as separate from the audio sensor 110, the audio receiver 124 may be integrated with the audio sensor 110. Further, the audio receiver 124 and the audio sensor 110 may be the same component, albeit with the capability to perform the different functions required by each.

The receiving apparatus 104 can include an RF receiver 126 that is configured to receive command and data signals that are typically sent using radio frequency. These signals may be sent via a wired link or across open air (i.e., "wirelessly"). In one embodiment, the signals are sent at a frequency of about 916 MHz. The signals are generally digital in nature, and typically have a bit rate from about 19.2 kbps to about 115 kbps, although other speeds are possible.

Although depicted in FIG. 1A as separate from the RF sensor 112, the RF receiver 126 may be integrated with the RF sensor 112. Further, the RF receiver 126 and the RF sensor 112 may be the same component, albeit with the capability to perform the different functions required by each.

In another embodiment, the receiving apparatus 104 includes a hardwire port 128 that allows a direct, wired access to the robot 100. Accordingly, command and data signals may be conveyed through a wire and to the robot 100 through the hardwire port 128. The hardwire port 128 can include one or more of a serial port (e.g., RS-232), a USB port, or a JTAG port.

In addition to the sensing apparatus 102 and the receiving apparatus 104, the robot 100 typically includes a transmitting apparatus 106. In general, the transmitting apparatus 106 is configured to transmit signals that include commands and other data (e.g., data acquired by the sensing apparatus 102) to, for example, one or more other robots. These signals may be conveyed from the robot 100 to their destination (e.g., one or more other robots) optically, via RF, via audio frequency, via stigmergy (discussed below), or via a physical link. In various embodiments, the transmitting apparatus 106 includes one or more amplifiers, and it may incorporate signal processing apparatus, to enhance or modify the signals and data transmitted.

The transmitting apparatus 106 may be considered analogous to the receiving apparatus 104. Accordingly, many components that may be included in the transmitting apparatus 106 can be similar to those included in the receiving apparatus 104. For example, an optical transmitter 130 is configured to transmit command and data signals that are typically sent using infrared light. These signals may be sent via a fiber optic link, or across open air. In other embodiments, the optical transmitter 130 may emit visible light. In different embodiments, the optical transmitter 130 includes one or more of a light emitting diode, or laser, or simple incandescent indicator lights. In one embodiment, the optical receiver 122 on another robot receives the signals sent by the optical transmitter 130 of robot 100.

Similarly, the transmitting apparatus 106 may include an audio transmitter 132 that transmits command and data signals at one or more audio frequencies, either inside or outside of the audible range. In one embodiment the audio transmitter 132 includes one or more speakers. In another embodiment the audio transmitter 132 includes one or more ultrasonic emitters. Other embodiments include one or more of sound synthesizers, speech synthesizers, or MIDI devices. The audio transmitter 132 may also be configured to provide high fidelity audio (e.g., stereo sound).

Continuing the analogy with the receiving apparatus 104, the transmitting apparatus 106 may include an RF transmitter 134 that is configured to transmit command and data signals that are typically sent using radio frequency. These signals may be sent via a wired link or across open air (i.e., "wirelessly"). In one embodiment, the signals are sent at a frequency of about 916 MHz. The signals are generally digital in nature, and typically have a bit rate from about 19.2 kbps to about 115 kbps, although other speeds are possible.

In one embodiment, the transmitting apparatus 106 includes a stigmergy transmitter 136. "Stigmergy" is typically defined as communication through the environment, which allows the coordination of actions between several objects. For example, "Object A" can communicate with "Object B" using stigmergy when Object A marks the environment in a way that Object B can detect. To illustrate, Object A can mark the environment by leaving a chemical trail as Object A moves. Object B can detect this trail and, for example, follow Object A, even if Object B cannot detect Object A. (Detection can also cause Object B to take other actions.) In addition to a chemical-based trail, the trail may include other matter having certain properties (e.g., optical, magnetic, etc.) that Object B can detect. Object A may also leave a trail by exposing at least a portion of the environment to, for example, a high- or low-temperature probe that marks the environment. In any case, the trail may disappear after some fixed time, meaning "stigmeric" communication can have a limited duration as well as provide temporal information as to when Object A was present at a particular location.

Stated in different terms, stigmergy is based on sensing and sampling the environment and responding to it. Note that stigmeric communication may also be achieved if the robot 100 is directed to perform a task that, as a consequence, alters the environment. Thus, by a single action, the robot 100 can (i) complete a task, and (ii) communicate with others.

In one embodiment, the stigmergy transmitter 136 includes a liquid reservoir and dispenser that deposits liquid (typically water) at the location of the robot 100. As the robot 100 moves, the stigmergy transmitter 136 creates a water trail on a nearby surface. If the surface changes its appearance (e.g., contrast, or color, or both) when dampened, the optical sensor 108, or the optical receiver 122, or both, can typically detect this change. Consequently, as robot 100 moves about leaving a water trail, one or more other robots can detect the trail and, for example, follow robot 100. When the water dissipates and the surface dries, communication by stigmergy is generally no longer possible. Nevertheless, in other embodiments, the stigmergy transmitter 136 deposits other material (i.e., other than water, and other than liquids), and time allowed for stigmeric communication can be varied according to material selection. For example, liquids or special surface treatments may be used including those with hydrochromic, photochromic (e.g., ultraviolet) or thermochromic properties.

In another embodiment, the transmitting apparatus 104 includes a hardwire port 138 that allows a direct, wired access to the robot 100. Accordingly, command and data signals may be conveyed through a wire and to the robot 100 through the hardwire port 138. The hardwire port 138 can include one or more of a serial port (e.g., RS-232), a USB port, or a JTAG port. In one embodiment, the hardwire port 138 and the hardwire port 128 included in the receiving apparatus 104 may be implemented as a single port capable of bidirectional transfer of the command and data signals.

In a related embodiment, the output power of the transmitting apparatus 106 may be set to a predetermined level to limit the range of the transmitted signals. For example, a signal transmitted at a reduced power may reach only a limited number of destinations out of all available destinations. Assuming the destinations to be other robots, this results in only a limited number of other robots responding to the transmitted signals, instead of all available other robots. Conversely, a signal transmitted at an increased power may reach most, if not all, available other robots. Consequently, the magnitude of the desired response to the transmitted signals, characterized by the number of responding robots, may be tailored for a particular application.

Although FIG. 1A depicts the receiving apparatus 104 and the transmitting apparatus 106 as separate elements, in one embodiment they are integrated in a single apparatus (e.g., a transceiver). The transceiver configuration exploits the analogous nature of the receiving apparatus 104 and the transmitting apparatus 106, as discussed above.

In one embodiment, the receiving apparatus 104 and the transmitting apparatus 106 includes multiple receivers and transmitters, respectively, arranged about the periphery of the robot 100. These receivers and transmitters typically have an overlapping field of view. For example, four receivers may be spaced at ninety-degree intervals, but each is able to receive signals in a 135-degree arc. Consequently, using differential signal strength received by the various receivers, the robot 100 determines the distance and relative position (i.e., bearing) of another robot. In still other embodiments, not shown, another receiver mounted above or below the plane of the transmitting apparatus 106 allows the calculation of the relative elevations between two robots. By measuring the relative elevation angles of various robots as the robots move through their environment, a contour map of the environment can be created.

In a further embodiment, the robot 100 includes a processing apparatus 140 that is in communication with the sensing apparatus 102, the receiving apparatus 104, and the transmitting apparatus 106 subsystems. The processing apparatus 140 typically includes a microprocessor and associated hardware (e.g., memory, logic included in, for example, gate arrays, etc.) that monitors and controls the operation of these subsystems. In another embodiment, the processing apparatus 140 also communicates with a locomotion apparatus 142. The locomotion apparatus 142 includes drivetrain components, such as wheels, motors, and gearing. The processing apparatus 140 communicates with the locomotion apparatus 142 to move the robot 100 in a desired fashion.

A power supply 144 is included to provide operating power for the robot 100 and its subsystems, including the locomotion apparatus 142. In one embodiment, the power supply 144 includes rechargeable batteries (e.g., based on NiCd, Li-MH, Li-Ion, etc., chemistries) and associated monitoring-charging circuitry. The monitoring-charging circuitry ascertains the capacity of the power supply 144 (i.e., the capacity of the rechargeable batteries). The processing apparatus 140 communicates with the power supply 144 and, based on the data provided by the monitoring-charging circuitry, determines when the capacity falls to a level where recharging is needed. If recharging is needed, the processing apparatus 140 then causes the robot to perform a contingency task that, in one embodiment, results in the robot 100 returning to a charging station where the batteries are recharged.

In a further embodiment, the processing apparatus 140 has complete control of the power supply 144. For example, the receiving apparatus 104 can receive a command to turn-off the robot 100. The processing apparatus 140, in communication with the receiving apparatus 104, processes this command and instructs the power supply 144 to remove power from the robot 100. Of course, portions of the robot 100 remain powered to permit the robot 100 to receive a subsequent "turn-on" command.

Figure 1D:
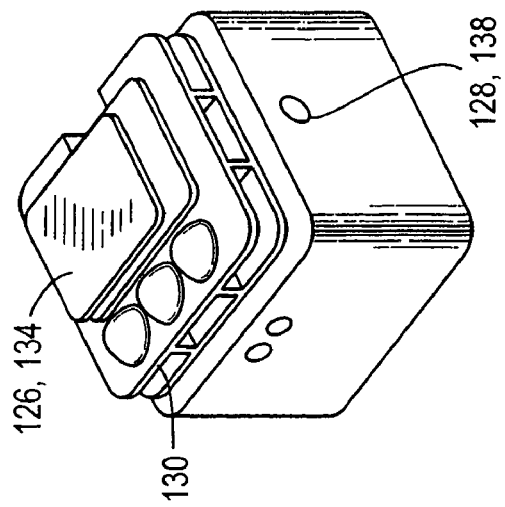
FIG. 1D is a view showing components of a robotic device in accordance with an embodiment of the invention.
Figure 1C:
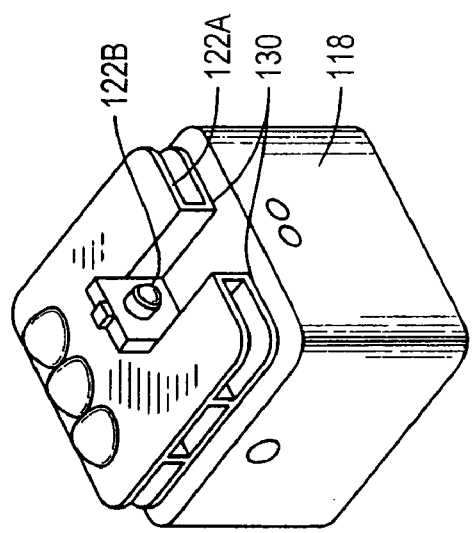
FIG. 1C is a view showing components of a robotic device in accordance with an embodiment of the invention.
Figure 1B:
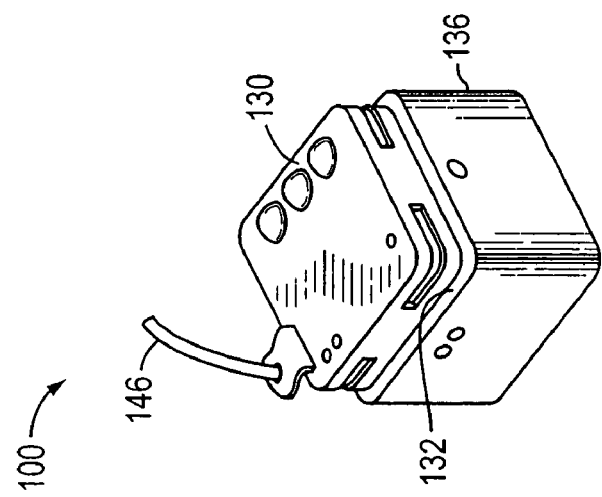
FIG. 1B is an external view of a robotic device in accordance with an embodiment of the invention.

FIGS. 1B, 1C, and 1D provide views of a robot in accordance with an embodiment of the invention. FIG. 1B is an external view showing, for example, some embodiments of the optical transmitter 130, the audio transmitter 132, and the stigmergy transmitter 136. Also depicted is a pantograph 146 that is connected to the power supply 144 to connect the latter with the charging station. The circuit formed between the charging station and the power supply 144 via the pantograph 146 permits charging of the batteries of the robot 100.

FIG. 1C provides a view of certain components of one embodiment of the invention. In particular, the tactile sensor 118 (e.g., a "bump skirt") is shown. Also shown are two implementations of the optical receiver 122: an infrared receiver 122A and a camera 122B. Lastly, two optical transmitters 130 are depicted.

FIG. 1D also provides a view of certain components of one embodiment of the invention. Specifically, the RF receiver 126 and RF transmitter 134 included in a 115 kbps digital radio are shown. Also depicted is the optical transmitter 130 configured to operate at about 125 kbps. Hardwire ports 128, 138 are also shown as 230 kbps serial ports.

Figure 2:
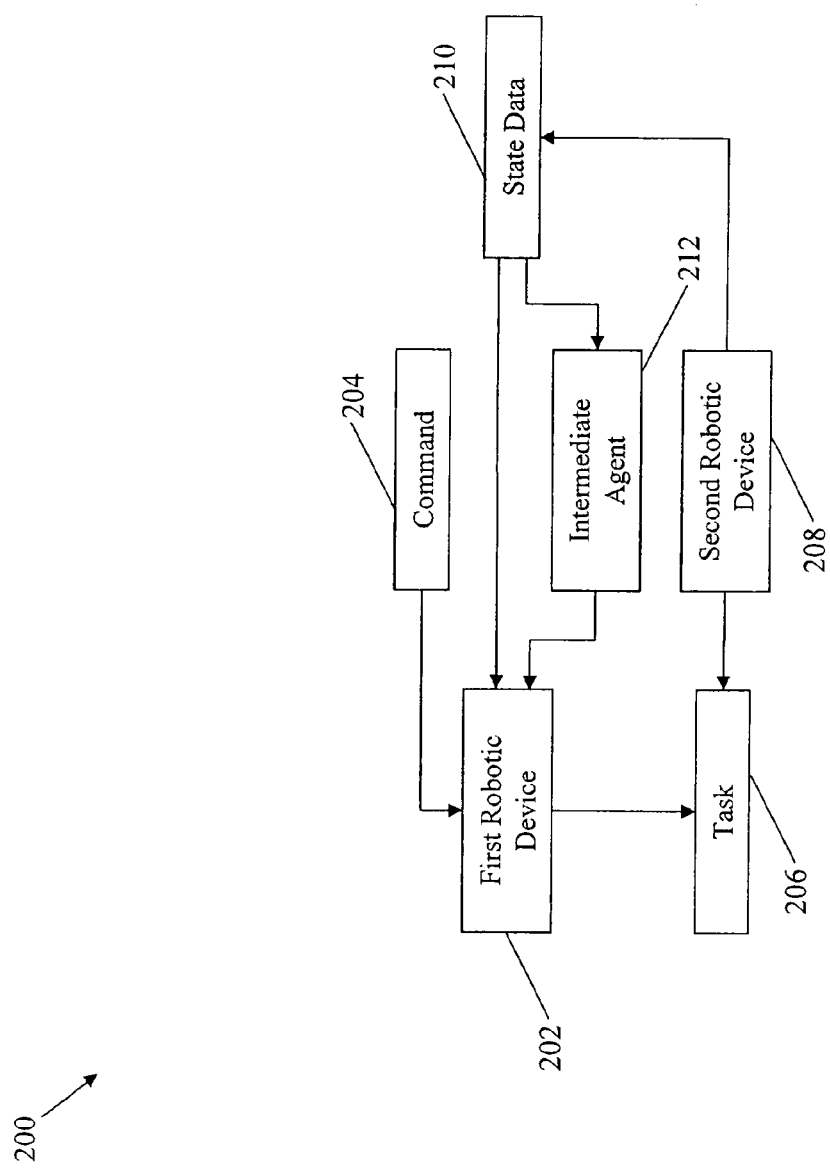
FIG. 2 is a flowchart that depicts a method for operating a robotic device in accordance with an embodiment of the invention.

FIG. 2 depicts a method 200 for operating robotic devices in accordance with an embodiment of the invention. This method includes the steps of defining a first robot 202 and a second robot 208. Next, the first robot 202 receives a multi-device primitive command 204 that influences a task 206 that the first robot 202, or the second robot 208, or both, will perform. Note that the second robot 208 need not be a robot but, in some embodiments, is a fixed transmitter capable, for example, of transmitting state data to the first robot 202.

The multi-device primitive command 204 is an instruction that prescribes the behavior of one robot in relation to the behavior of another robot. This contrasts with a single device primitive command, wherein the behavior of one robot depends on the command and, optionally, an external event, but not necessarily on the behavior of another robot. For example, commands to move a distance, in a direction, or to rotate a certain number of degrees, or to stop motion, are single device primitive commands because the robot receiving them can act on them without regard to another robot. Other example single device primitive commands include those directing a robot to move, rotate, or stop motion until the sensing apparatus 102 detects a particular condition. This condition can include anything discernable by the sensors included in the sensing apparatus 102, as described above. For example, a robot could receive a single device primitive command to move in a direction until it contacts another object, as determined by the tactile sensor 118. Another example single device primitive command includes directing the robot to move, rotate, or stop motion until it senses the presence of a power line (e.g., detected by the electromagnetic sensor 114). A further example includes directing the robot to move, rotate, or stop motion when it determines the absence, presence, or interruption of data received by the sensing apparatus 102, or the receiving apparatus 104, or both.

The multi-device primitive command 204 differs from the single device version at least because the resulting behavior of the robot receiving the former depends in part on one or more other robots. For example, one multi-device primitive command 204 in the orientation primitive category is the "match orientation" primitive. The match orientation primitive instructs a robot to match its orientation with that of at least one other specified robot. (A robot discerns its orientation relative to a reference point typically based on data acquired by the positional sensor 116. The robot can transmit its orientation information to, e.g., other robots, using the transmitting apparatus 106, as discussed above. This transmission is generally in response to its receiving an inquiry as to orientation.)

Referring to the embodiment depicted in FIG. 2, the first robot 202 receives the match orientation primitive that is included in the multi-device primitive command 204. The first robot 202 then determines the orientation of the second robot 208 by, for example, using its transmitting apparatus 106 to transmit an orientation inquiry to the second robot 208. Using its receiving apparatus 104, the first robot 202 receives state data 210 that includes the orientation information. Using its processing apparatus 140, the first robot 202 processes the orientation information, and then performs the task 206 that includes moving to position itself in the identical orientation using the locomotion apparatus 142.

In general, the state data 210 can include one or more of the data acquired by the sensing apparatus 102 of the second robot 208, as discussed above. Consequently, the state data 210 provides a representation of at least part of the area where the second robot 208 is located. For example, this can be a visual representation (e.g., by using the optical sensor 108), an audio representation (e.g., by using the audio sensor 110), an electromagnetic representation (e.g., by using the electromagnetic sensor 114), and a tactile representation (e.g., by using the tactile sensor 118).

The state data can also include information concerning the identity of the second robot 208, its hierarchy (e.g., priority) among several robots, its operational readiness (e.g., in service or out of service), and its configuration (e.g., identity of on-board hardware, version of operating software, task, mission, etc.).

The state data 210 can be conveyed from the second robot 208 to the first robot 202 in several ways. Some embodiments convey the state data 210 optically by using, for example, the optical transmitter 130 in the second robot 208 and the optical receiver 122 in the first robot 202. Other embodiments convey the state data 210 via radio frequency or audio frequency using the corresponding components in the transmitting apparatus 106 of the second robot 208 and the receiving apparatus 104 of the first robot 202. The state data 210 can also be conveyed via a physical link between the robots 202, 208. Physical links can be between, for example, the hardwire ports 128, 138. A physical link can also be established with a fiber optic cable. In a different embodiment, the state data are conveyed via stigmergy.

As discussed above, the output power of the transmitting apparatus 106 may be set to a predetermined level to limit the range of the transmitted signals. Using this feature, certain embodiments similarly limit the range of the transmitted state data 210.

In some embodiments, the first robot 202 receives the state data 210 directly from the second robot 208. This typically occurs when the distance between the robots 202, 208 is within the communication range of their receiving apparatus 104 and transmitting apparatus 106. When optical communication is used, this generally occurs when there is an unobstructed path between the robots 202, 208. Nevertheless, in other embodiments, the first robot 202 receives the state data 210 via one or more intermediate agents 212. The intermediate agent 212 can be, for example, a third robotic device. This third robotic device is typically positioned to be within communication range of both the first robot 202 and the second robot 208 and acts as a repeater, relaying information between the robots 202, 208. In the case of optical communication, there is an unobstructed path between the first robot 202 and the third robot, and between the second robot 208 and the third robot. This allows for the instance where, for example, an obstruction between the robots 202, 208 prevents line-of-sight communication.

In a related embodiment, the intermediate agent 212 is a remote sensor, such as a camera positioned to observe the robots 202, 208. In one version of this embodiment, the camera detects the signals emitted by the optical transmitter 130 of the second robot 208. The remote sensor includes image processing apparatus that interprets these signals. For example, the optical transmitter 130 can include one or more indicator lights having a particular color or illumination pattern (e.g., frequency, intensity, duty cycle, etc.) that represent the state of the second robot 208. The remote sensor observes the indicator lights, interprets the colors, or patterns, or both, and relays the meaning of the signals to the first robot 202.

An alternative embodiment includes an operator performing the function of the remote sensor. The operator (e.g., human) observes the signals (e.g., visible, audible) emitted by the transmitting apparatus 106 of the second robot 208 and interprets their meaning. The operator can then relay the corresponding information to the first robot 202. The operator typically uses one or more transmitting devices that emit signals that the receiving apparatus 104 of the first robot 202 can discern.

Figure 3:
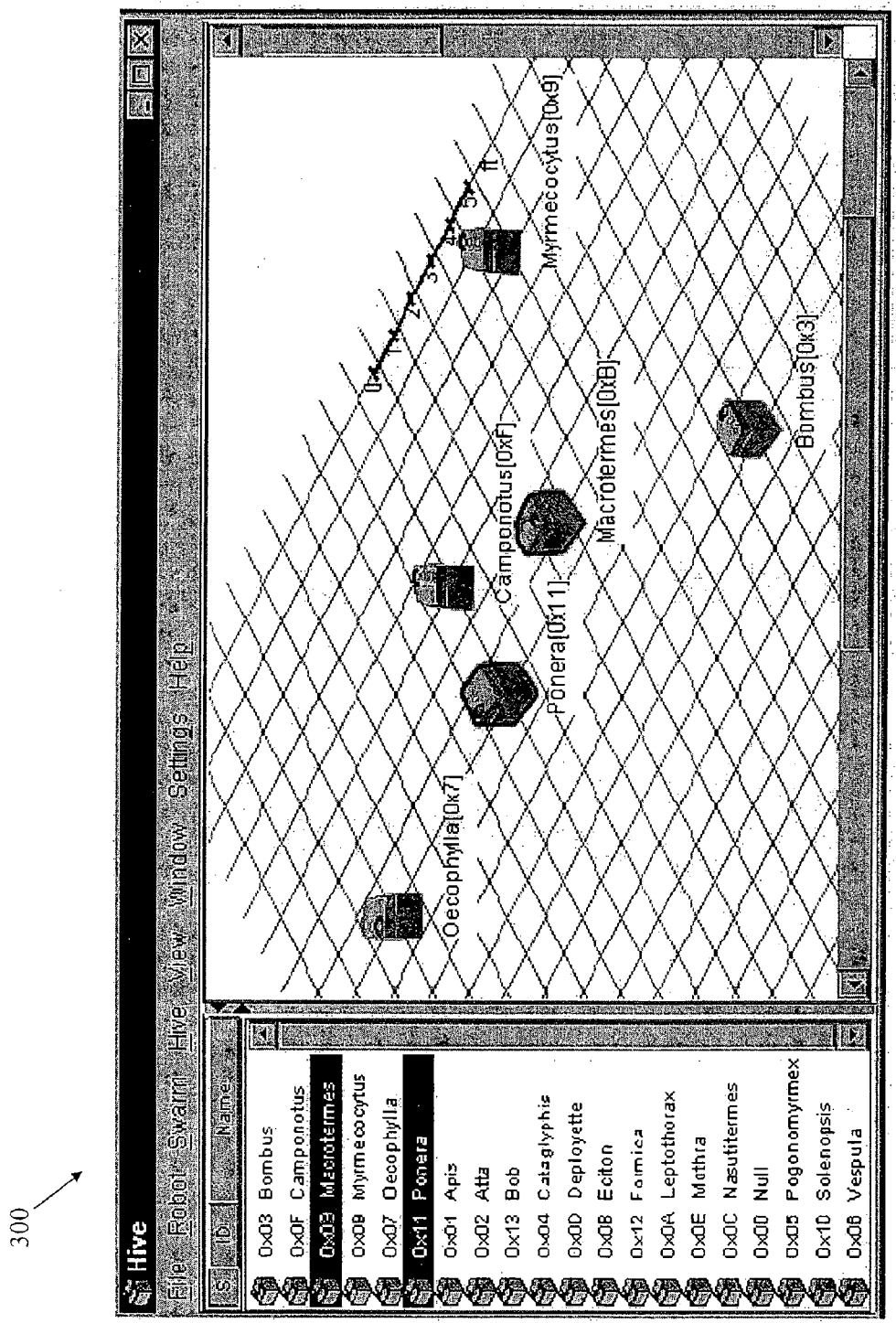
FIG. 3 is an example screen display of a user interface in accordance with an embodiment of the invention.

In a related embodiment shown in FIG. 3, a computer running software provides the operator with a visual representation 300 of the location and status of one or more robots. Icons representing the robots include indicia (e.g., elements representing the optical transmitter 130) that correspond to the state data 210. The operator observes these icons and then communicates with one or more of the robots, typically by using a transmit feature included in the software.

Although the first robot 202 typically receives the state data 210 because the second robot 208 transmits it, such a sequence is not required. In certain embodiments, for example, the first robot 202 receives the state data 210 transmitted by an operator. In this case, the state data 210 may or may not conform to the actual state of the second robot 208.

Another multi-device primitive command 204 in the orientation category is the "orient to robot" command. This command instructs the first robot 202 to position itself relative to the second robot 208 based on, for example, bearing. This differs from the match orientation command because the result of the task 206 need not orient the robots 202, 208 identically.

Yet another multi-device primitive command 204 in the orientation category is the "orient for orbit" command. This command instructs the first robot 202 to position itself such that if it were moving forward, it would tend to orbit the second robot 208. For example, if the distance between the first robot 202 and the second robot 208 is greater than an orbit radius, this behavior will make the first robot 202 head toward the second robot 208. If the distance is less than the orbit radius, then this behavior will point the first robot 202 away from the second robot 208. Any distance about equal to the orbit radius will typically orient the first robot 202 tangentially to the second robot 208.

The multi-device primitive command 204 can also include commands in a bond primitive category. This category includes commands that prescribe, for example, distances between robots that are maintained when the robots are in motion. One such multi-device primitive command 204 is the "maintain distance" command that keeps the first robot 202 a prescribed distance away from the second robot 208. Another command in this category is the "bond with" command that causes the first robot 202 to take a prescribed position and bearing relative to the second robot 208. This is similar to the "orient to robot" command, with the added feature that the position and bearing are maintained as the robots 202, 208 are put in motion.

A further multi-device primitive command 204 is the "follow robot" command where the first robot 202 follows the second robot 208 at a prescribed distance while maintaining an orientation toward the second robot 208. This command is similar to a combination of the "maintain distance" and "orient to robot" commands.

In some embodiments, each robot has an identifier to distinguish it from other robots. It can transmit the identifier to other devices (e.g., other robots), as well as receive and recognize the identifiers of other devices (e.g., other robots). The transmission can include information regarding the identifier or information specifying which transmitter out of several on a particular device transmitted the message, or both. This information can be used to help a robot determine the orientation of its neighbor. For example, the first robot 202 can determine the bearing of and distance to the second robot 208 by engaging multiple receivers and transmitters and examining corresponding differences in signal strengths. Alternatively, and as discussed above, the robots 202, 208 can exchange bearing and distance information, thereby obviating the need to perform signal strength calculations or improve the accuracy of the information through the sharing of information. This typically results in improved orientation information.

In some embodiments, each robot periodically (e.g., asynchronously, using a cycle of four times per second) communicates with the other robots. The corresponding asynchronous signals are organized into packets of data that are continuously received. Robots receiving the incoming data packets typically sort the data into buffers so each robot is able to maintain one or more data structures that include information regarding its current neighbors. In one embodiment, the stored data includes information such as the identifier of the neighbor, the bearing to the neighbor, the distance to the neighbor, the task the neighbor is performing, and the progress of the task toward completion. In a related embodiment, a robot may be removed from a data structure if no data are received from it after a prescribed number of cycles.

In a related embodiment, each robot stores data received in connection with the multi-device primitive command 204. Typical data includes one or more of the identifier of the device (e.g., robot) that originated the command, the identifier of the device (e.g., robot) that relayed the command, or parameters pertaining to one or several multi-device primitive commands 204.

A message transmitted from its source to a destination may experience more than one communication "hop." To illustrate, one robot can receive a signal directly from a transmitting robot or indirectly via, for example, one or more intermediate robots acting as communication repeaters. A "hop count" characterizes the number of receptions and retransmissions that occur from the transmitting robot to the receiving robot via the repeaters. Consequently, the hop count provides a way to determine the separation between the message source and a receiver, corresponding to the distance that the message (e.g., the multi-device primitive command 204) has traveled. One use of the hop count occurs if a robot receives multiple copies of the same multi-device primitive command 204 in the same cycle. In one embodiment, the robot stores information corresponding to that message having the lowest hop count. In other words, the robot stores the multi-device primitive command 204 received most directly from the source.

In some embodiments, the data passed between devices (e.g., robots) includes information requiring retransmission of the data and, optionally, any related multi-device primitive command 204. The information typically includes details identifying the source of the data. The information can also include the hop count as well as a maximum allowable hop count. When, for example, the first robot 202 receives a message requiring retransmission, the first robot 202 increments the hop count and, if it is less than the maximum allowable hop count, retransmits the message to, for example, the second robot 208. The message can also include information that only one or more specifically identified robots receive the data.

In one embodiment, if a device (e.g., robot) receives data requiring retransmission (i.e., message traffic), it typically communicates the presence of this traffic to other devices (e.g., other robots) via the aforementioned asynchronous signals. The data structures based on these signals (described above) generally include information regarding the presence or absence of traffic in neighbor robots. This can be used, for example, to determine the number of robots in a group that include the traffic.

In another embodiment, the traffic includes information to synchronize several robots to a common clock, typically a robot defined as the "temporal leader." In general, this is achieved by sending, via the aforementioned asynchronous signals, data that includes the identifiers of the temporal leader and the transmitting robot, and the times of signal transmission and reception. When a robot receives synchronization information from a neighboring robot, it compares this information with similar data received from other neighboring robots. Only synchronization information having the lowest hop count is generally retained. The synchronization information is typically discarded after the current cycle to prevent the accumulation of stale data.

A robot generally uses the retained synchronization information to adjust its clock to agree with that of the temporal leader, within an allowable error. For example, the robot can add the signal transmission time to its clock, subtract the signal reception time, and set its clock to agree with the mathematical result. Adjusting the clock by applying these offsets will synchronize it with the clock of the temporal leader, subject to, for example, the interrupt latency and lag of the processing apparatus 140. Synchronization errors introduced by these effects can increase with increasing hop count.

In some embodiments, a transmitting robot requires a "handshake" to acknowledge that at least one receiving robot has received the transmission. Alternatively, a robot may transmit a message without requiring a handshake.

A multi-bond primitive category of commands is similar to the bond primitive category. One difference is that the multi-bond primitive category of commands includes commands that influence more than two robots. For example, the "follow leader" multi-device primitive command 204 is a combination of the "follow robot" command and a list of robot identifiers.

When the robots receive the "follow leader" command, the leader (e.g., the first robot 202) is recognized. The other robots (collectively, the second robot 208) identified on the list locate the first robot 202 by using their respective sensing, receiving, and transmitting apparatus 102, 104, 106. The other robots then position themselves behind the first robot 202, typically in the order that they appear in the list. The robots maintain their positions when the first robot 202 is in motion.

Another multi-device primitive command 204 in the multi-bond primitive category is the "distributed follow leader" command. This command is similar to the "follow leader" command, but without the list of-robot identifiers. On receipt of this command, the leader robot (e.g., the first robot 202) transmits a signal that causes the second robot 208 to follow. The second robot 208 then transmits a signal that causes another robot to follow it. This process continues until a "chain" of robots reaches a desired length. One advantage of the "distributed follow leader" command is that if a robot in the chain is disabled, the preceding robot can retransmit the signal to "recruit" another robot to follow it. Consequently, a chain of robots configured as described can exhibit a self-healing capability providing autonomous restoration of a damaged chain.

Note that selection of a "leader" robot may be based on one or more criteria. For example, in one embodiment, the robot having the lowest identifier is designated the leader.

The multi-device primitive command 204 can also include commands in a disperse primitive category. This category includes, for example, the "avoid robot" command. When the first robot 202 receives this command, it will perform the task 206 to avoid (e.g., move away from) a prescribed robot (e.g., the second robot 208). The identity of the robot to avoid can be included in the "avoid robot" command. Alternatively, the first robot 202 can determine the identity based on, for example, instructions also included in the command. To illustrate, the first robot 202 may receive the "avoid robot" command that includes instructions to avoid the robot nearest its position. The first robot 202 can use one or more of its sensing, receiving, or transmitting apparatus 102, 104, 106 to locate and identify the nearest robot and then move away accordingly.

The disperse primitive category also includes the "disperse source" multi-device primitive command 204. On receipt of this command, the first robot 202 transmits a signal and, when one or more second robots 208 receive it, they move away from the first robot 202 and any other robot in communication with the first robot 202. In other words, the one or more second robots 208 move away until they no longer receive a signal from the first robot 202 or any other robot in communication with the first robot 202. This typically disrupts the some or the entire inter-robot communication network.

The "disperse source-network" command is similar to the "disperse source" command but avoids disrupting the network. The "disperse source-network" multi-device primitive command 204 limits the dispersion of the second robots 208 from the first robot 202 to the maximum communication range of the receiving apparatus 104 and transmitting apparatus 106, or another prescribed range.

The "disperse equidistant" multi-device primitive command 204 causes each robot in a group of several to determine their distances relative to each other. The global maximum and minimum distances are calculated, and then each robot orients itself (i.e., moves) in an attempt to equalize these distances.

The multi-device primitive command 204 can also include commands in a cluster primitive category. This category includes, for example, the "cluster source" command. When the first robot 202 receives this command, it transmits a signal to other robots (collectively, the second robot 208) that receive it directly or indirectly (e.g., via intermediate robots acting as communication repeaters). A hop count between the first robot 202 and the second robot 208 is determined. On receipt of the signal, each second robot 208 moves to follow those robots having hop counts less than their own. Consequently, the second robots 208 eventually converge on the first robot 202.

A related primitive category is a clumping primitive category. One multi-device primitive command 204 in this category is typically transmitted to a group of robots. Each robot transmits a corresponding signal in a different manner by, for example, including its identifier in the transmission. Other robots receive one or more of these signals. (In general, when a robot receives more than one signal, an algorithm (e.g., based on distance to the transmission source, which may be determined by hop count, or time of arrival) allows it to select one.) Each receiving robot then moves to converge on the robot transmitting the signal and away from other groups. A result is that several clusters of robots form, typically one for each transmitting robot. Note that, similar to as discussed above, the number of robots in each cluster can be determined by examining the data structures of each source robot.

A group orbit primitive category includes an "orbit robot" multi-device primitive command 204. When the first robot 202 receives this command it locates the second robot 208 and performs the task 206 that includes orbiting the latter.

The "orbit group" multi-device primitive command 204 is another command in the group orbit category. When the first robot 202 receives this command it determines the location of several other robots (collectively, the second robot 208). The first robot 202 then performs the task 206 of orbiting the perimeter of these robots.

A topological navigation primitive category includes an "interstitial navigate" multi-device primitive command 204, where the second robot 208 will navigate through several intervening robots to reach the first robot 202. The second robot 208 typically queries each intervening robot to determine the number of communication hops between the intervening robot and the first robot 202. The second robot 208 generally queries each intervening robot it encounters and moves toward those with the lowest hop counts. Using this method the second robot 208 eventually reaches the first robot 202, where there is typically a zero hop count between them. Note that this command allows the second robot 208 to follow a path marked by other robots to reach the first robot 202.

Another multi-device primitive command 204 in the topological navigation primitive category is the "edge detect" command, where several robots determine whether they are on the edge or periphery of the communication network linking them. A robot typically determines the edge by first identifying its neighbor robots and then computing the angle between each pair of neighbors. (This is the angle formed between two line segments: one segment between the robot and the first neighbor, and the second segment between the robot and the second neighbor.) If this angle is greater than about 120 degrees, the robot is deemed to be at an edge.

A surround primitive category includes the "surround object" multi-device primitive command 204. On receiving this command, the first robot 202, on encountering an object and detecting it with the sensing apparatus 102, stops and transmits with the transmission apparatus 106 a request to other robots (collectively, the second robot 208) to orbit. Each of the other robots orbits the first robot 202 until each detects the object and stops. Eventually, a chain of robots forms about the perimeter of the object. The last robot to arrive at and become part of the perimeter typically transmits a message that includes the length of the perimeter and the number of robots.

A shape primitive category includes the "shape formation" multi-device primitive command 204. This command is generally used to prescribe a physical layout of a group of robots. For example, a computer-based description of a desired shape may be entered into the user interface shown in FIG. 3. This may be accomplished by, for example, clicking on and dragging each icon into a desired position that will comprise the shape. A computer program then translates this spatial representation of the shape into computer code that the processing apparatus 140 can handle (e.g., the "C" language) and downloads it into one or more robots. On execution of the corresponding task 206, the robots locate each other and position themselves in a shape corresponding to that prescribed. If a robot becomes disabled (indicated by, for example, the transmission of an out of service message or the lack of response to a query), another robot can substitute (either by command or on its own initiative). Consequently, the arrangement of robots can exhibit a self-healing capability providing autonomous restoration of a damaged shape.

The multi-device primitive commands 204 described above can be conveyed to the first robot 202 by any method that the first robot 202 can detect using its sensing apparatus 102, or receiving apparatus 104, or both. Further, the transmission source of these commands can be a computer running software like that described above regarding FIG. 3, a central transmitter, or another robot, or any combination thereof.

One feature of the multi-device primitive commands 204 is that the commands are generally followed and adhered to even when the subject robots are in motion. In other words, the relationship between the first robot 202 and the second robot 208 that results from the task 206 performed after receipt of the multi-device primitive command 204 is typically preserved when one or both of the robots 202, 208 are moving. If, for example, the first robot 202 is given an orbit group command, and the corresponding group of robots is moving, the first robot 202 will endeavor to orbit the moving group, modifying its path accordingly. This contrasts with, for example, a single device primitive command that would typically permit orbiting of a stationary object, because this type of command generally does not depend on the behavior of another robot.

Figure 4:
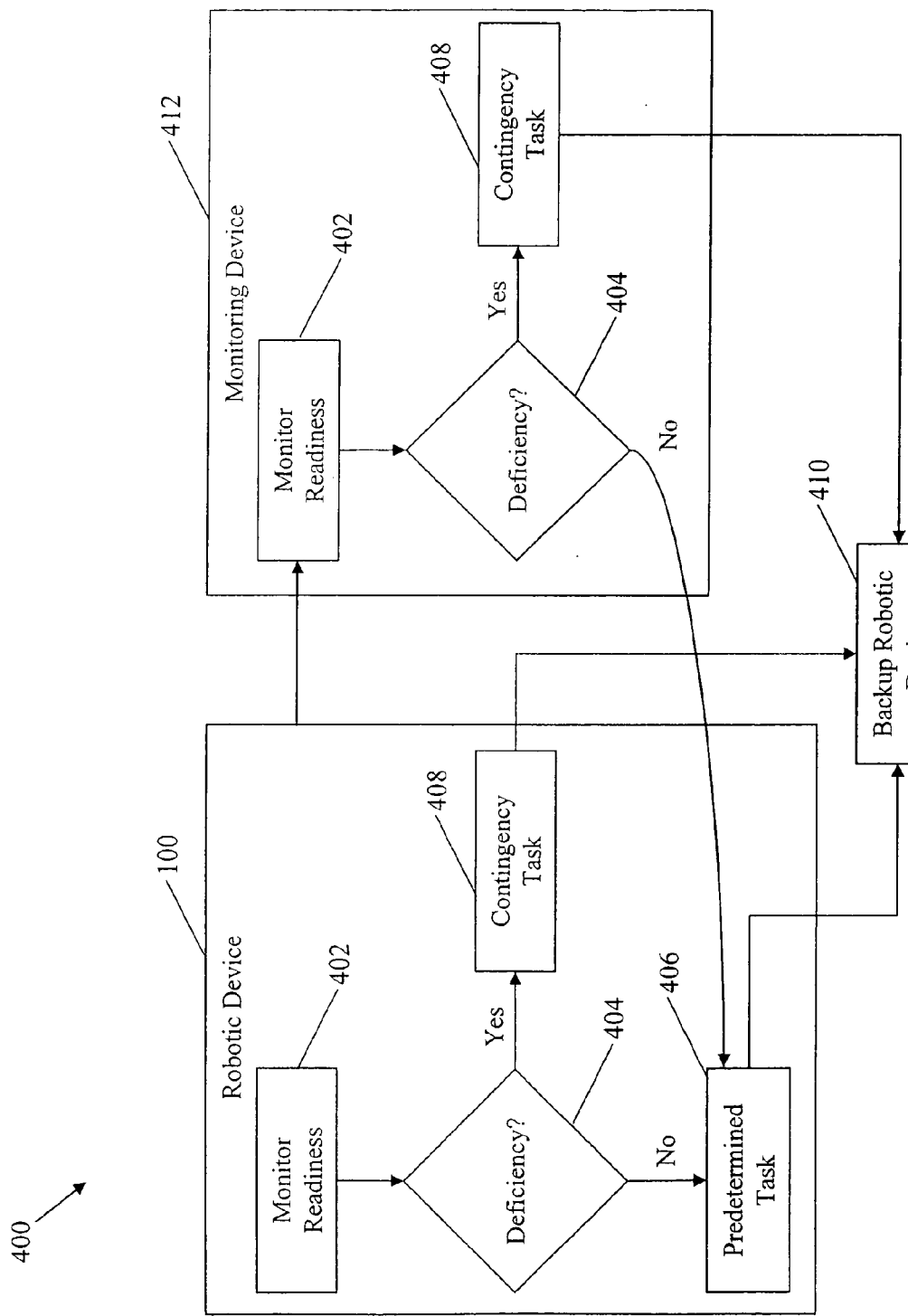
FIG. 4 is a flowchart that depicts a method for monitoring a robotic device in accordance with an embodiment of the invention.

In brief overview, FIG. 4 depicts a method 400 for operating robotic devices in accordance with an embodiment of the invention, so as to monitor their operational readiness to complete at least one predetermined task 406. In one embodiment, a robot 100 monitors its operational readiness (step 402). The robot 100 then checks for a deficiency (step 404) in its capabilities to perform the predetermined task 406. If no deficiencies are identified, the robot 100 performs the task 406. On the other hand, if one or more deficiencies are detected, the robot 100 performs a contingency task 408 that is based at least in part on the deficiency. An example deficiency that the robot 100 can detect is a reduced capacity (i.e., level) of its power supply 144. In this case, the contingency task 408 includes the robot 100 returning to a charging station that will replenish the power supply 144.

The deficiency may also include an operational failure, i.e., the inability to complete the predetermined task 406 due to, for example, a hardware failure. In any instance where the robot 100 detects a deficiency, the contingency task 408 can include the transmission of an out of service message to, for example, one or more backup robots 410. These backup robots are typically capable of performing the predetermined task 406 in the absence of the robot 100. On reception of the out of service message, one or more of these backup robots 410 generally assume the position of the stricken robot 100 and endeavor to complete the predetermined task 406.

In another embodiment, a monitoring device 412 monitors (e.g., remotely) the operational readiness of the robot 100 (step 402) and detects any deficiencies therein (step 404). Similar to the embodiment described above, the robot 100 performs the predetermined task 406 if no deficiencies are present; otherwise the contingency task is performed (step 408). Nevertheless, by including the monitoring device 412, instances where the robot 100 is unable to transmit notice of its deficiency (e.g., send the out of service message) before becoming disabled are addressed. For example, the robot 100 may suffer an abrupt and unexpected failure and be unable to transmit the out of service message. Typically, the monitoring device 412 interrogates each robot periodically and, if robot 100 fails to respond after a certain number of attempts, the monitoring device 412 will conclude that robot 100 is disabled. Processing this as a deficiency, the monitoring device 412 then executes the contingency task 408. The contingency task may include engaging one or more backup robots 410 to complete the predetermined task 406. Note that the monitoring device 412 need not be a centralized transceiver in communication with several robots. On the contrary, in some embodiments, the monitoring device may be a robot (designated a "leader robot") tasked with observing the operational readiness of one or more robots 100.

One feature of the aforementioned embodiments to monitor operational readiness is that robot 100 is typically autonomous with respect to managing deficiencies. In other words, once the robot 100 or the monitoring device 412 identifies a deficiency, one or more robots react to remedy the deficiency generally without intervention. The value of this feature becomes apparent when the number of robots increases to a point where it is too large to permit individualized monitoring and control of each robot by, for example, a human operator using a centralized control apparatus.

In another embodiment, monitoring is accomplished in cooperation with the transmitting apparatus 106. A robot 100 is configured to emit optical signals, or audio signals, or both using the optical transmitter 130, or the audio transmitter 132, respectively. These signals correspond at least in part to the state of the robot 100 and, therefore, may be considered state data. If these signals are observable (e.g., by a human operator), any inconsistencies therein may be readily discernable as, for example, an unexpected series of patterns in indicator lights. Further, the audio signal representing the state of several robots working cooperatively may be relatively uniform. A robot with inconsistent state data typically emits a different audio signal, thereby calling attention to itself. The capability to emit signals that allow an operator to discern operational inconsistencies between robots facilitates debugging, monitoring, and operation of the robot group. The value of this is apparent when the number of robots increases making it difficult to monitor the progress of each by conventional means.

Figure 5:
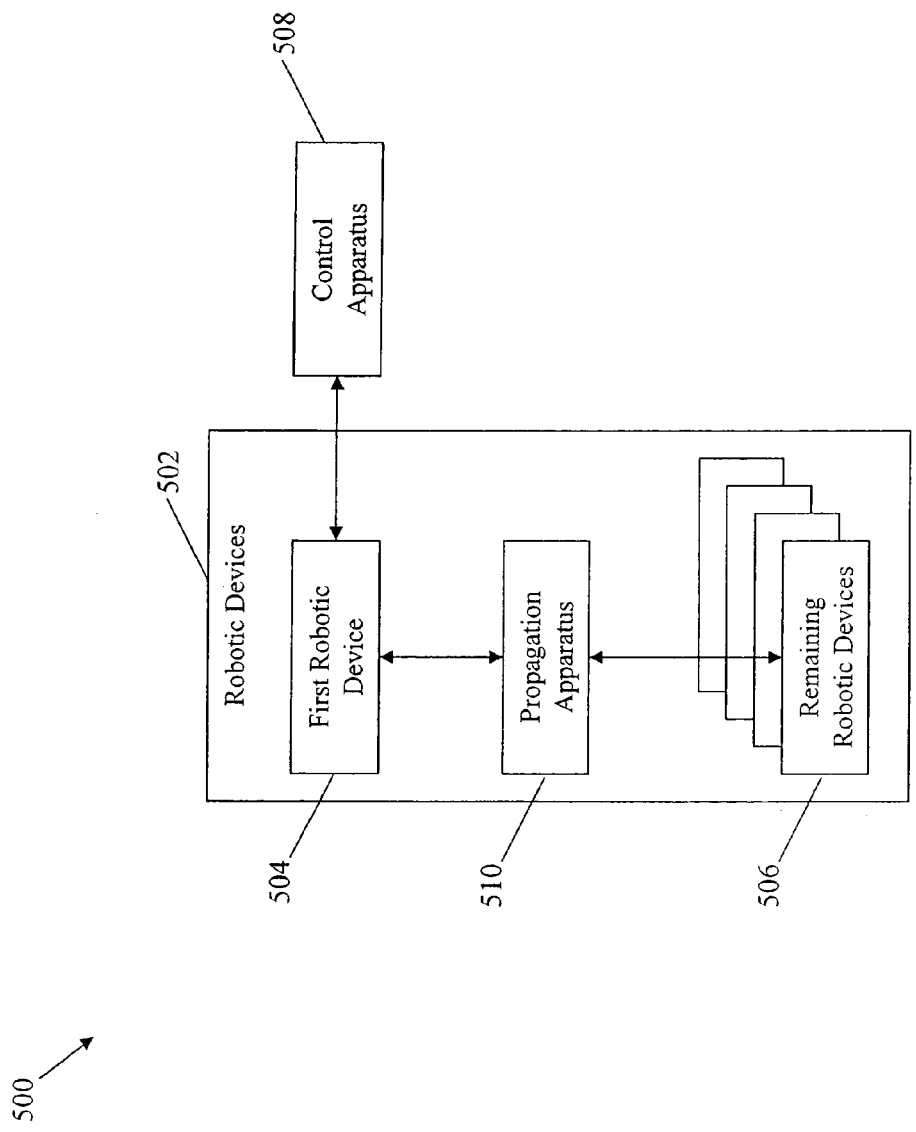
FIG. 5 is a flowchart that depicts a method for communicating with robotic devices in accordance with an embodiment of the invention.

As discussed above regarding the shape formation multi-device primitive command 204, computer code may be downloaded into one or more robots. FIG. 5 depicts a method 500 for downloading and propagating this code among several robots 502 in accordance with an embodiment of the invention. In this embodiment, a central control apparatus 508 includes a central transmitter and a computer running software like that described above regarding FIG. 3. The central control apparatus 508 typically communicates with a first robot 504 out of the several robots 502, sending configuration data to the first robot 504. Configuration data, which are included in the configuration primitive category of multi-device primitive commands 204, typically include settings and other parameters that direct the first robot 504 to receive new programming. The new programming (i.e., code) is also included in the configuration data.

The control apparatus 508 can continue transmitting the configuration data until all robots 502 acknowledge receipt. Nevertheless, in one embodiment, efficiency is increased by limiting this transmission so it is directed to the first robot 504. The first robot 504 then transmits the configuration data to the remaining robots 506 within the group of robots 502. The transmission from the first robot 504 to the remaining robots 506 is managed by a propagation apparatus 510. The propagation apparatus 510 typically includes the transmitting apparatus 106 to convey this transmission. In one embodiment, the configuration data includes a signal propagation hierarchy that prescribes the order in which the remaining robots 506 are to be configured. In this case, the propagation apparatus 510 detects and processes the hierarchy information and configures its transmitting apparatus 106 to ensure that the specified remaining robots 506 are accessed and configured in the specified (i.e., predetermined) sequence. The hierarchy can also command that all robots 502 stand ready to receive the configuration data at the same time.

Propagation of the configuration data may occur from the first robot 504 to the remaining robots 506, as described above. Alternatively, the propagation may be from the first robot 504 to only one of the remaining robots 506. That one remaining robot may then, in turn, propagate the configuration data to yet another one of the remaining robots 506. This autonomous process can repeat, and eventually all of the remaining robots 506 can receive the configuration data. Clearly, this represents an increase in efficiency because it relieves the control apparatus 508 from the task of potentially downloading configuration data several times to ensure all of the robots 502 acknowledge receipt.

In a related embodiment, the propagation of the configuration data includes selective processing of the configuration data. For example, certain of the remaining robots 506 may be in reception range of the transmitted configuration data, but they may not need all of the configuration data. Consequently, these robots having only a partial need typically receive all of the configuration data but only process and implement the needed portion. In other words, these robots "listen in" on the entire transmission, identify those portions having needed data (e.g., modules of revised code), and process it accordingly.

Robots with the capabilities like those described above are able to perform many different tasks. The commands permit autonomous operation, meaning these robots can perform the tasks with little or no outside intervention. Thus, the embodiments of the invention described herein provide systems and methods that allow "hands off" functionality. The value of this feature becomes apparent when the number of robots increases such that individual control of each is unmanageable. Consequently, tasks such as data collection, mapping, and searching may be completed with large numbers of robots that, on receipt of multi-device primitive commands 204, engage in cooperative behaviors to achieve certain goals.

In addition to the above, further details are available in the following progress reports submitted to the Defense Advanced Research Projects Agency ("DARPA"):

Report dated Mar. 20, 2001, under contract number N66001-99-C-8513;

Report dated May 31, 2002, under contract number N66001-99-C-8513; and

Report covering May 1, 2002 to Jul. 31, 2002, under contract number DASG60-02-C-0028.

These progress reports are incorporated herein by reference, in their entirety.

From the foregoing, it will be appreciated that the methods of operating and monitoring robotic devices provided by the invention afford a simple and effective way to deploy several robots to complete a task. Robots according to embodiments of the invention are able to interact with each other, sense ambient conditions, and adapt their behavior accordingly to drive the task to completion. This increases efficiency and does not overburden a central command and control apparatus or operator.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for operating a robotic device capable of receiving at least one multi-device primitive command, the method comprising the steps of:
    monitoring, by the robotic device, of its operational readiness to complete at least one predetermined task;
    determining, by the robotic device, a deficiency in its operational readiness; and
    executing, by the robotic device, a contingency task based at least in part on the deficiency.

2. The method of claim 1 wherein the deficiency comprises a reduced power supply level and the contingency task comprises returning to a charging station.

3. The method of claim 1 wherein the deficiency comprises an operational failure and the contingency task comprises transmitting an out of service message.

4. The method of claim 3 wherein the out of service message is conveyed to at least one backup robotic device.

5. The method of claim 4 wherein the at least one backup robotic device executes the at least one predetermined task.

6. A method for operating a robotic device capable of receiving at least one multi-device primitive command, the method comprising the steps of:
    monitoring, by a monitoring device, of an operational readiness of the robotic device to complete at least one predetermined task;
    determining, by the monitoring device, a deficiency in the operational readiness of the robotic device; and
    executing, by the monitoring device, a contingency task based at least in part on the deficiency.

7. The method of claim 6 wherein the deficiency comprises a loss of communication between the monitoring device and the robotic device.

8. The method of claim 6 wherein the contingency task comprises causing at least one backup robotic device to execute the at least one predetermined task.

9. The method of claim 6 wherein the monitoring device is a leader robotic device.

10. A method for configuring a plurality of robotic devices capable of receiving at least one multi-device primitive command, the method comprising the steps of:
    defining a first robotic device and a remainder of robotic devices in the plurality of robotic devices;
    conveying configuration data to the first robotic device; and
    propagating the configuration data from the first robotic device to at least one of the remainder of robotic devices.

11. The method of claim 10 wherein the step of propagating the configuration data occurs in a predetermined sequence.

12. A method for monitoring a plurality of robotic devices capable of receiving at least one multi-device primitive command, the method comprising the steps of:
    equipping each robotic device with at least one of an optical transmitter and an audio transmitter;
    defining at least one of (i) a plurality of optical signals, and (ii) a plurality of audio signals, corresponding at least in part to a state of each robotic device;
    transmitting, by each robotic device, at least one of the optical signal and the audio signal; and
    observing a plurality of transmitted signals to ascertain inconsistencies therein.

13. A system of robotic devices configured to perform at least one task, the system comprising:
    a plurality of robotic devices capable of receiving at least one multi-device primitive command, the plurality comprising a first robotic device and a remainder of robotic devices;
    a control apparatus capable of conveying configuration data to the first robotic device; and
    a propagation apparatus capable of conveying the configuration data from the first robotic device to at least one of the remainder of robotic devices;
    wherein each robotic device comprises:
        a sensing apparatus capable of receiving data based at least in part on a location occupied by each robotic device;

a receiving apparatus capable of receiving data from at least one of the control apparatus and at the least one of the remainder of robotic devices; and a transmitting apparatus capable of transmitting data to at least one of the control apparatus and at the least one of the remainder of robotic devices.

14. The robotic devices of claim 13 wherein the sensing apparatus comprises at least one of an optical sensor, an audio sensor, a radio frequency receiver, a positional sensor, a tactile sensor, an environmental sensor, and an electromagnetic sensor.

15. The robotic devices of claim 13 wherein the receiving apparatus comprises at least one of an optical receiver, an audio receiver, a radio frequency receiver, and a hardwire port.

16. The robotic devices of claim 13 wherein the transmitting apparatus comprises at least one of an optical transmitter, an audio transmitter, a radio frequency transmitter, a stigmergy transmitter, and a hardwire port.

17. The robotic devices of claim 13 wherein the receiving apparatus and the transmitting apparatus are integrated in a single apparatus.

18. The robotic devices of claim 13 wherein the at least one task comprises at least one of data collection, mapping, and searching.

* * * * *

UNITED STATES PATENT AND TRADEMARK OFFICE
CERTIFICATE OF CORRECTION

PATENT NO. : 7,117,067 B2 Page 1 of 1
APPLICATION NO. : 10/417401
DATED : Ocotber 3, 2006
INVENTOR(S) : James McLurkin et al.

It is certified that error appears in the above-identified patent and that said Letters Patent is hereby corrected as shown below:

Column 1,
line 16, delete "The U.S." and insert --This invention was made with--

Column 1,
lines 16 through 18, delete "may have certain rights in this invention as provided for by the terms of one or more of the following contracts:" and insert --support under:--

Column 1,
line 31, insert the following paragraph:
--The Government has certain rights in this invention.--

Signed and Sealed this

Thirteenth Day of November, 2007

JON W. DUDAS
*Director of the United States Patent and Trademark Office*